US010243366B2

(12) United States Patent
Biellmann

(10) Patent No.: US 10,243,366 B2
(45) Date of Patent: Mar. 26, 2019

(54) AUXILIARY ELECTRIC ENERGY STORAGE AND SUPPLY SYSTEM FOR A POWER PLANT

(71) Applicant: GE Energy Products France SNC, Belfort (FR)

(72) Inventor: Hervé Biellmann, Eloie (FR)

(73) Assignee: GE ENERGY PRODUCTS FRANCE SNC, Belfort (FR)

(*) Notice: Subject to any disclaimer, the term of this patent is extended or adjusted under 35 U.S.C. 154(b) by 0 days.

(21) Appl. No.: 15/529,045

(22) PCT Filed: Aug. 7, 2015

(86) PCT No.: PCT/FR2015/052182
§ 371 (c)(1),
(2) Date: May 23, 2017

(87) PCT Pub. No.: WO2017/025664
PCT Pub. Date: Feb. 16, 2017

(65) Prior Publication Data
US 2018/0145511 A1 May 24, 2018

(51) Int. Cl.
*H02J 3/32* (2006.01)
*H02J 11/00* (2006.01)
(Continued)

(52) U.S. Cl.
CPC .............. *H02J 3/32* (2013.01); *F01K 3/12* (2013.01); *F01K 7/16* (2013.01); *H02J 3/381* (2013.01); *H02J 11/00* (2013.01)

(58) Field of Classification Search
CPC .......... H02K 3/40; H02K 19/34; H02K 19/36; H02K 19/365; H02K 2203/15; H02J 3/00
See application file for complete search history.

(56) References Cited

U.S. PATENT DOCUMENTS

| | | | | |
|---|---|---|---|---|
| 4,967,135 A | * | 10/1990 | Ashikaga | H02P 21/09 318/798 |
| 6,486,568 B1 | * | 11/2002 | King | B60L 11/02 307/66 |
| 7,176,648 B2 | * | 2/2007 | Choi | B29C 45/7666 318/370 |

(Continued)

FOREIGN PATENT DOCUMENTS

| | | |
|---|---|---|
| EP | 2595266 A1 | 5/2013 |
| FR | 2678952 A1 | 1/1993 |

(Continued)

OTHER PUBLICATIONS

Abb: "Power Generation Energy Efficient Design of Auxiliary Systems in Fossil-Fuel Power Plants", Internet Citation, Apr. 12, 2009 (Apr. 12, 2009), pp. 139-200, 358.

(Continued)

*Primary Examiner* — Mark A Laurenzi
*Assistant Examiner* — Shafiq Mian
(74) *Attorney, Agent, or Firm* — Armstrong Teasdale LLP

(57) ABSTRACT

An annex supply system for an electrical power plant includes an energy extraction network configured to receive AC current from a main production unit, a main auxiliary network coupled to the extraction network, and a secondary supply unit. The secondary unit includes a storage element coupled to a means for reversible conversion from direct to alternating current that is controllable to selectively (i) charge the storage element from the main auxiliary network, and (ii) discharge energy from the storage element to the main auxiliary network. The secondary unit is configured to (i) provide a first power profile at least sufficient to provide services to a transmission network, and/or (ii) provide to the main auxiliary network a second power profile required to operate auxiliary equipment in case of inoperability of a normal power supply source of the main auxiliary network.

20 Claims, 3 Drawing Sheets

(51) Int. Cl.
*F01K 3/12* (2006.01)
*F01K 7/16* (2006.01)
*H02J 3/38* (2006.01)

(56) References Cited

U.S. PATENT DOCUMENTS

| | | | | |
|---|---|---|---|---|
| 8,244,419 | B2* | 8/2012 | Wegner-Donnelly | ........................ B63H 23/24 105/61 |
| 9,006,927 | B2* | 4/2015 | Pena | ......................... F02C 1/00 290/4 R |
| 2011/0277480 | A1* | 11/2011 | Aboujaib | .............. F01D 25/002 60/734 |
| 2012/0292992 | A1* | 11/2012 | Williams | ................ F02D 19/10 307/23 |
| 2013/0127164 | A1* | 5/2013 | Pena | ......................... F02C 1/00 290/2 |
| 2013/0286512 | A1* | 10/2013 | Omachi | ............... G11B 5/4833 360/294.1 |
| 2014/0244056 | A1* | 8/2014 | Pena | ......................... F02C 1/00 700/287 |
| 2015/0091484 | A1* | 4/2015 | Royak | ................. H02M 5/4585 318/400.26 |
| 2016/0359324 | A1* | 12/2016 | Knowles | ................ B64D 47/00 |

FOREIGN PATENT DOCUMENTS

| | | |
|---|---|---|
| WO | 9917426 A2 | 4/1999 |
| WO | 2011059425 A2 | 5/2011 |
| WO | 2015098004 A1 | 7/2015 |

OTHER PUBLICATIONS

FR Search Report for related Application No. PCT/FR2015/052182, dated Aug. 7, 2015, 12 pages.

* cited by examiner ated with the main electric energy production unit which provides electric power to the electric distribution network in order, on the one hand to compensate for the inertia of the steam turbine which drives the generator of the main production unit if required for the power plant to ensure the primary response requested by the network and, on the other hand, to provide electricity to the auxiliary network of this power plant.

AUXILIARY ELECTRIC ENERGY STORAGE AND SUPPLY SYSTEM FOR A POWER PLANT

CROSS-REFERENCE TO RELATED APPLICATIONS

This application is a National Stage Entry of PCT/FR2015/052182, filed Aug. 7, 2015, the disclosure of which is incorporated herein by reference in its entirety.

BACKGROUND

The disclosure refers generally to electric energy production systems. More particularly it refers to the installations of the type of electric energy production power plants feeding an electricity transmission network.

At present, the auxiliary equipment of an electric power plant is fed from an alternating current auxiliary network derived from the energy extraction network of the power plant, which itself is connected to the electricity transmission network fed by the power plant and to the energy production unit.

Generally, these installations also comprise an emergency direct current network which is used in case of loss of the main energy sources feeding the auxiliary network.

Furthermore, these installations comprise various devices that allow ensuring various network services through the power plant. The term "network service" refers to the technical functionalities carried out through the electricity production power plants in order to ensure proper operation of the electricity transmission network to which they are connected, as for example rapid supply of surplus electric energy that allows answering to the primary response demand that the power plant must be capable of supplying at the request of the network.

The application for European patent published under the reference EP 2595266 (A1) describes for this purpose an electric energy production installation comprising means for generation of electric energy meant to be connected to a distribution network and storage means for a part of the electric energy produced in the form of mechanical energy, through flywheels. The energy stored is restored on demand to the installation in electric form in order to ensure support functions such as:

frequency and voltage regulation (in permanent and transient regime);
support of small outages of the network;
the guarantee of an optimal load state of the storage means in cases of outage;
the use of energy stored in mechanical form to bear the shutdown of the main energy production unit and particularly limitation of the phenomenon of excess speed of the generator shaft;
support on restarting of the power plant in case of extended outage of the network.

The electric energy production power plant thus described includes an electric energy production system, generated from the kinetic energy stored in the flywheels. This system is associated with the main electric energy production unit which provides electric power to the electric distribution network in order, on the one hand to compensate for the inertia of the steam turbine which drives the generator of the main production unit if required for the power plant to ensure the primary response requested by the network and, on the other hand, to provide electricity to the auxiliary network of this power plant.

This electric energy production system is managed by a controller controlling the operation of the energy storage means and their connection with the electricity generation means and transportation network.

The document cited above highlights the advantages procured by setting up an energy storage system in a power plant in order to improve its capacity to provide primary response, while it is operational. However, it is possible to envisage taking advantage of the functionalities procured by such a system when the power plant is shutdown and that the electric energy stops being supplied by the main unit. In fact, today several electric power plants have been led to operate in a cyclical manner, i.e. during a given period (season, day, week . . . ). They alternate between periods of operation and periods of shutdown. The term "shutdown" refers to periods during which the production unit of the power plant does not supply power to the transmission network, as the turbine is shutdown and the generator is connected or disconnected from the network. Consequently, the use during these periods of shutdown of the energy storage system will allow increasing the profitability of these power plants.

Furthermore, the cited document describes an energy storage system in the form of kinetic energy. However, it may be judicious to consider other types of energy storage systems. The electric energy storage and production through electrochemical generators can thus prove to be very competitive, in terms of cost, vis-à-vis storage in the form of mechanical energy, particularly when high autonomy is required. In fact, energy storage in kinetic form is very appropriate to provide high power for short time (to the order of the minute), but it is less appropriate for longer periods (to the order of several minutes to several hours).

Also some auxiliaries, currently called critical auxiliaries, of an electric power plant require to be fed for periods attaining several hours, in case of break down, i.e., inoperability, of the normal power supply source of the auxiliary network of the power plant. For example, this is the case of shaft line lubrication systems which, in case of break down of the auxiliary network power supply of the power plant, must be maintained operational in order to ensure its shutdown and restarting under good conditions.

In fact, the power supply of the auxiliaries of an electric power plant is generally carried out, as illustrated in FIG. 1, through two types of distribution networks:

one main auxiliary network, average voltage 4 and low voltage 15, of type having alternating current, the main function of this network being to feed, from the energy transmission network 1 or the main energy production unit 2, all the medium voltage 6 and low voltage 16 auxiliaries of the power plant required for its proper operation. In these auxiliaries, one typically finds electric pump units, actuators as well as auxiliary motors operating on medium or low voltage, either at fixed frequency, or at variable frequency, the frequency variation may be realized through static frequency converters.

an auxiliary network 17 called "emergency network" of type having direct current, whose main function is to compensate for a break down of the main auxiliary network and to allow maintaining in operation, at least temporarily, critical auxiliaries of the power plant in order to ensure the shutdown of the power plant and its restarting under correct conditions.

From these critical auxiliaries, we can particularly cite the shaft line lubrication systems of the main unit 2, whose alternating current motors are rendered redundant by the direct current motors, supplied with power by the batteries, meant to ensure lubrication of the shaft line and its shutdown without damage in case of loss of supply of the main alternating current auxiliary network 4, 15.

Classically, the emergency network of an electricity production power plant is thus particularly constituted of one or more batteries and various equipment functioning on direct current, such as the distribution panels, control-command devices and motors and actuators. This equipment, powered on direct current, is connected to the main auxiliary network 4, 15, through the electronic circuits for conversion of alternating current into direct current. In normal operation of the power plant, the batteries are recharged from the main auxiliary network 15. In case of malfunction, the batteries restore the electric energy stored in the equipment operating on direct current.

However, the implementation within a same power plant of two types of auxiliary networks, a main auxiliary network 4, 15 in alternating current and a direct current network 17, induces complexity of implementation of the auxiliaries and engenders considerable costs throughout the lifecycle of the power plant (for example during study, commissioning and operation phases of the power plant). In fact, these two networks are partially redundant and the material operating on direct current, which particularly constitutes the emergency equipment of the critical auxiliaries, is less widespread than equivalent material operating on alternating current and, thus, in general more expensive. Furthermore, this emergency equipment and the elements constituting it, are exclusively dedicated to the emergency function in case of break down.

Thus, considering the network architecture of a classic power plant and the operating limitations relating to the maintenance of integrity of the power plant in case of break down of the supply of the main auxiliary network 4, 15, there is an actual need to develop a more efficient auxiliaries support architecture, which particularly allows simplifying the implementation of the latter and ensures their maintenance in operation even in case of break down, without necessarily having recourse to the emergency measures intended to be used only in this case.

In parallel, there is a need to provide an architecture allowing improving the network services which may be carried out through the power plants in order to make them more competitive, even extend the range of network services that may be ensured.

BRIEF DESCRIPTION

Embodiments of the disclosure improve the capacities of an electric power plant in terms of network and operation services while drastically simplifying the architecture of its auxiliary electric distribution.

Embodiments of the disclosure include an annex system of the electric energy supply system. In addition to the electric energy supply for an electricity production power plant feeding an electricity transmission electric network, the electricity production power plant bearing at least one turbine connected with a generator forming a main electric energy production unit which provides alternating current to an energy extraction network connected to the transmission network, the energy extraction network also feeding a main auxiliary network, the main auxiliary network enabling feeding the auxiliary equipment required for the functioning of the power plant. The system according to the embodiments of the disclosure includes a secondary electric energy supply unit itself bearing at least one elementary electric energy storage and restitution unit that is operable in continuous fashion. The elementary unit comprises electric energy storage elements connected to a means of reversible conversion from direct current to alternating current ensuring, on command, the charge of the storage elements from the electric energy delivered by the main auxiliary network or discharge of the electric energy stored in the storage elements on the said main auxiliary network.

According to the invention, the secondary electric energy production unit is dimensioned and designed in a manner as to be able to:

either provide to the electricity transmission network the time based electric power profile at least sufficient to ensure the network services requested, and this even for network services that must be ensured when the main unit is shutdown;

or provide to the main auxiliary network of the power plant the time based power profile required to feed the critical auxiliaries of the power plant in case of break down of the supply of the said main auxiliary network.

or ensure both of the previous two functions.

According to various provisions that may be considered alone or in combination with each other, the system according to the embodiments of the disclosure may present additional characteristics.

Thus, according to an aspect, the secondary electric energy supply unit is dimensioned in a manner as to be able to supply to the electricity transmission network the time based electric power profile that enables compensating the inertia of the gas turbine and/or steam turbine at the time of providing the primary response.

According to another aspect, the secondary electric energy production unit bears several elementary units each comprising at least one electric energy storage element and a reversible AC-DC converter connected to the inlets of the storage element. The assembly is connected to the electricity transmission network or to the energy extraction network or the main auxiliary network of the power plant. The elementary units are dimensioned in order to be able to produce at the time of commissioning simultaneously at least the requested power.

According to another aspect, the power plant being fitted with an auxiliary thermal power generator and/or a second backup thermal power generator unit, the secondary electric energy supply unit is dimensioned in a manner as to be able to deliver power at least equivalent to that of the first auxiliary thermal unit or that of the second auxiliary thermal unit or the sum of power of these two units.

According to another aspect, the secondary electric energy supply unit is dimensioned such that it supplies sufficient power by itself to enable the starting of the generator of the main unit, or that, the power plant being fitted with an auxiliary thermal power generator unit connected, on command, to the main auxiliary network, it provides sufficient power so that the adding of the power provided by the storage means and power provided by the auxiliary thermal power generator unit is sufficient to enable the starting of the generator of the main unit.

According to another aspect, the elementary cell of the secondary electric energy supply unit additionally has additional means of reversible conversion from direct current to alternating current, connected to the electric energy storage elements. These means are configured and connected in a manner as to enable the secondary electric energy supply unit, on command, to supply the generator of the main unit in start phase of the latter from the voltage available on the main auxiliary network and/or energy available in the energy storage elements, or to charge electric energy storage elements and/or supply the main auxiliary electric network by drawing electric energy through additional conversion means directly on the terminals of the generator when it is operational.

According to another aspect, the additional means for reversible conversion from direct current to alternate current are configured in order to provide, on command, a supply voltage of variable frequency intended to feed the motors of the auxiliary equipment likely to operate in variable regime.

Furthermore, according to another aspect, the elementary cell of the secondary electric energy supply unit comprises a supplementary DC-DC converter, connected in parallel to the additional means for reversible conversion from direct current to alternating current, and allowing feeding the rotor of the generator of the production unit.

According to another aspect, the supplementary means of the means for reversible conversion from direct current to alternate current, are carried out from the IGBT switches (insulated gate bipolar transistors) controlled by appropriate means.

Furthermore, according to another aspect, the system according to the embodiments of the disclosure comprises command means that allow operation of each one of the reversible conversion means either in AC-DC converter or DC-AC converter delivering a fixed frequency alternating current, or alternatively a variable frequency alternating current.

Furthermore, the the disclosure includes an electricity production power plant which has an annex electric energy production system according to the embodiments of the disclosure.

The annex electric energy storage and restitution system proposed advantageously allows designing an electricity production power plant that includes means that simultaneously allow:
  providing the requested network services when the power plant is in operation;
  providing additionally some network services when the power plant is shutdown;
  providing the power required to feed the critical auxiliaries of the power plant in case of loss of normal supply of its main auxiliary network.

More specifically, by using some types of electrochemical generators with judiciously specified characteristics, the annex electric energy storage and restitution system proposed can be advantageously configured to provide a certain time based profile of primary reserve power and, once this primary reserve is delivered, to always be capable of providing, subsequently, the time based profile of power required to supply the critical auxiliaries of the power plant during the desired period. In fact, the power profile of the primary response requires the supply of high power only for a few minutes, which does not cause full discharge of the electrochemical generators insofar as these are dimensioned for this purpose.

BRIEF DESCRIPTION OF THE DRAWINGS

The characteristics and advantages of the disclosure will be better assessed thanks to the following description, description which is based on the attached figures which present.

It is to be noted that in the different figures, a same structural or functional element is identified by the same numerical or alphanumerical marking.

DETAILED DESCRIPTION

Figure 2:
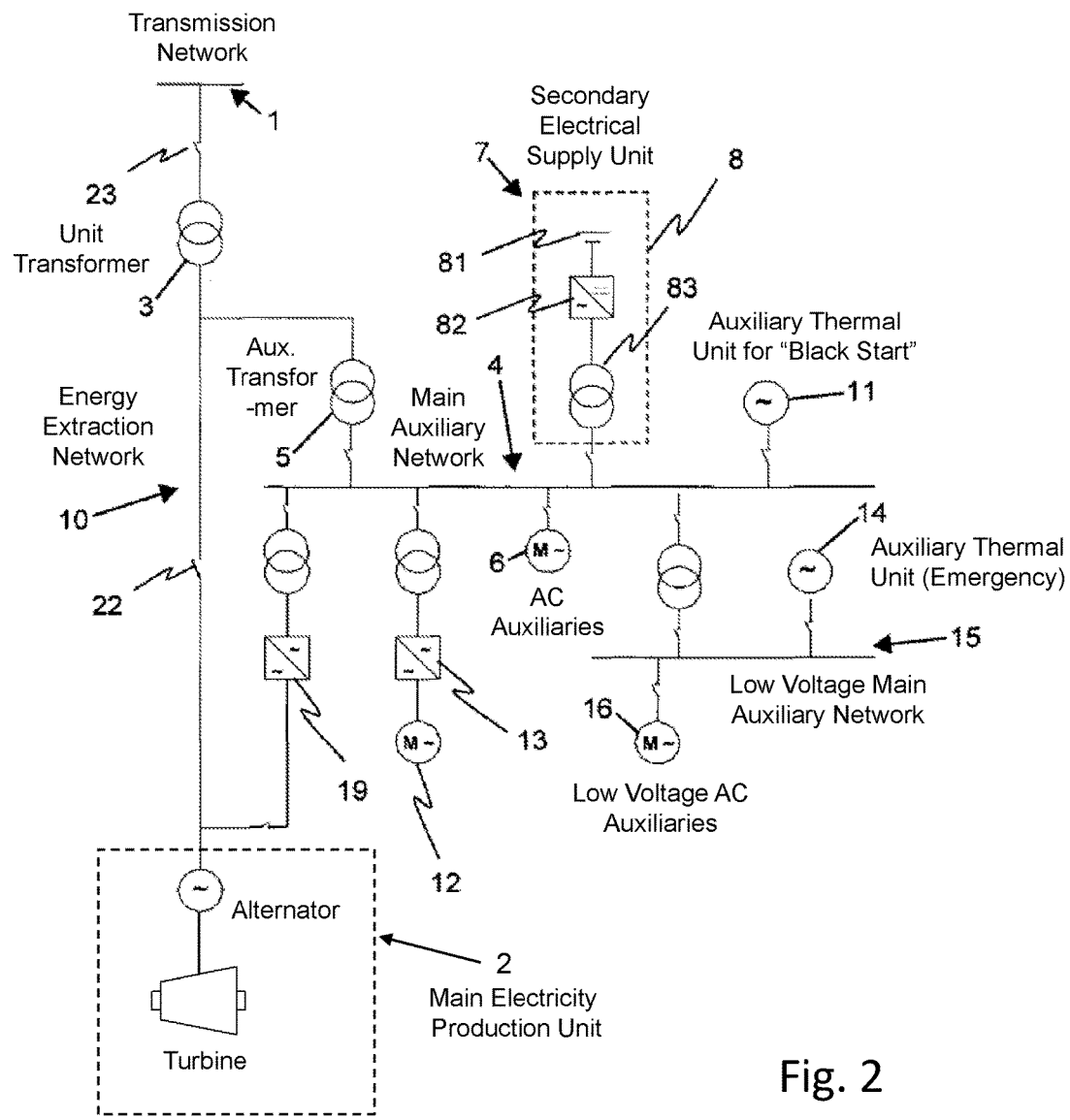
FIG. 2, a block diagram presenting the basic structure of a system according to an embodiment of the disclosure and its interconnection with an auxiliary circuit of an electricity production power plant.

FIG. 2 presents the system set-up principle in a diagram according to the disclosure, in a first embodiment, within the electric distribution network of an electricity production power plant.

This network typically comprises an energy extraction network 10 connecting the main electricity production unit 2 of the power plant, particularly comprising a turbine and a generator driven by the said turbine, to an electricity transmission network 1, via a unit transformer 3, as well as a medium voltage 4 and low voltage 15 main auxiliary network, connected to the energy extraction network 10 via an auxiliary transformer 5. Medium voltage 6 and low voltage 16 auxiliaries of the power plant, as well as one or more annex electricity production units, are connected respectively to medium voltage main auxiliary network 4 and low voltage main auxiliary network 15.

The auxiliaries 6, 16 are constituted by equipment required for the proper functioning of the power plant, as well as the electric and electronic management and control components and equipment fulfilling tasks indispensable to the proper functioning of the main electricity production unit as for example shaft line lubrication pumps of the main unit 2.

From the annex electricity production units provided to the power plant, there are specifically auxiliary thermal power generator units 14 and 11, whose functions respectively consist:
  for the auxiliary thermal unit 14, to feed some critical auxiliaries of the power plant in case of break down of the supply of the main auxiliary network 4,15,
  for the auxiliary thermal unit 11, to provide an energy input to enable starting the power plant without supply from the transmission network 1.

As illustrated in FIG. 2, the annex electric energy supply system according to the disclosure mainly includes a secondary electric energy supply unit 7, capable of storing electric energy drawn from the power plant network in which it is integrated and to restore this energy to this same network.

For this purpose, the secondary unit 7 mainly has one or more elementary units or cells 8 for electric energy supply configured and connected in a manner as to be able to function in parallel. For reasons of simplicity and clarity of the diagram, FIG. 2 presents a secondary unit 7 including a single cell 8.

As illustrated in FIG. 2, each elementary unit 8 has electric energy storage means 81 constituted for example of electrochemical generators, in other words called accumulator batteries. Since several elementary units can be used in parallel, it is possible to associate several means of storage of different technologies in order to optimize the dimensioning and thus the cost of the secondary unit.

Each unit 8 also has one or more reversible alternating-direct converters 82, each converter being preferably constituted of electronic power switches, of the insulated gate bipolar transistor, or IGBT, type whose functioning is managed by the system command means.

Dimensioning of the secondary unit 7 may be carried out either by dimensioning the different elements 81 and 82 of an elementary unit 8, and/or by selecting the number of elementary units 8 constituting the secondary unit 7 under consideration.

In a preferred implementation mode of the system according to the disclosure, means of command, not represented in FIG. 2, allow operating the converters 82 of the different elementary units 8 either as an AC-DC converter, or as a DC-AC converter delivering a fixed frequency alternating current or variable frequency alternating current.

Furthermore, each elementary unit 8 is permanently connected, according to the power that it is required to develop, to the energy transmission network 1 or energy extraction network 10 or to the main auxiliary network 4, through a reversible converter 82 of direct electric energy to alternate electric energy (AC-DC conversion and DC-AC conversion) and, if necessary, via a voltage adaptation transformer 83.

Furthermore, each elementary unit 8 can be connected to either of these networks either directly with the converter (or one of the converters) 82, or through a matching transformer 83.

According to the invention each elementary unit 8 may be put into operation separately via the system command means. Thus, the division into elementary units of the secondary energy supply unit 7 advantageously allows, in the event where the secondary unit 7 has several elementary units 8, activating only the number of elementary units corresponding to the expected energy contribution requirements.

Thus, dimensioning of the secondary power unit 7 may be carried out either by dimensioning the different elements 81 and 82 of an elementary unit 8, and/or by selecting the number of elementary units 8 constituting the secondary unit 7 under consideration.

Integration of an energy storage and restitution system in electric form, such as the system according to the disclosure, in the equipment of an electricity production power plant presents several advantages, among which are:

a) The option of designing energy production power plants not comprising direct current emergency networks or redundant emergency auxiliary equipment, functioning on direct current, such as those described above in connection with the prior art.

Integration in a power plant of the system according to the embodiments of the disclosure allows, by configuring the secondary electric energy supply unit 7 in an appropriate manner, with the help of system command means, having at hand an alternating current auxiliary supply allowing, in case of breakdown of the energy extraction network 10, feeding, via the main auxiliary network 4, 15 and for a fixed period, the auxiliaries 6 and 16 functioning on alternating current.

b) The option of upgrading existing power plants in a manner as to be able to improve the network services provided by them and thus increasing their profitability, by integrating the system according to the embodiments of the disclosure in the power plant.

c) The option of improving and increasing the network services rendered by the power plant, by ensuring particularly:
better frequency and voltage regulation (in permanent and transient regime), this regulation passing through:
support to the network for maintenance of the frequency of the transmission network by supplying active power (primary response, secondary response, and improved stability of the generator in case of voltage dips on the network or "fault ride through" recovery ("FRT recovery"),
support to the network for voltage maintenance of the transmission network by supply of reactive power,
a contribution, within the framework of a procedure for restarting of the power plant on "dead buses", i.e. without supply of auxiliary power from the transmission network, sometimes referred to as a "black-start", d) Increased reliability and robustness of the power plant in response to the voltage dips.

e) The option of reducing maintenance costs of the power plant by removal of equipment (electric panels and equipment, motors . . . ).

f) The option of having a modular and configurable auxiliary supply thanks to the modular structure of the system according to the embodiments of the disclosure, modularity which furthermore confers upon the system better reliability and greater robustness.

In this regard, the secondary energy supply unit 7 may be dimensioned to provide the time based power profile corresponding to the required network service and the time based power profile required to ensure supply of critical auxiliaries and allow, at least temporarily, their continued operation, in a way as to ensure the shutdown of the power plant and its restarting under proper conditions.

Figure 1:
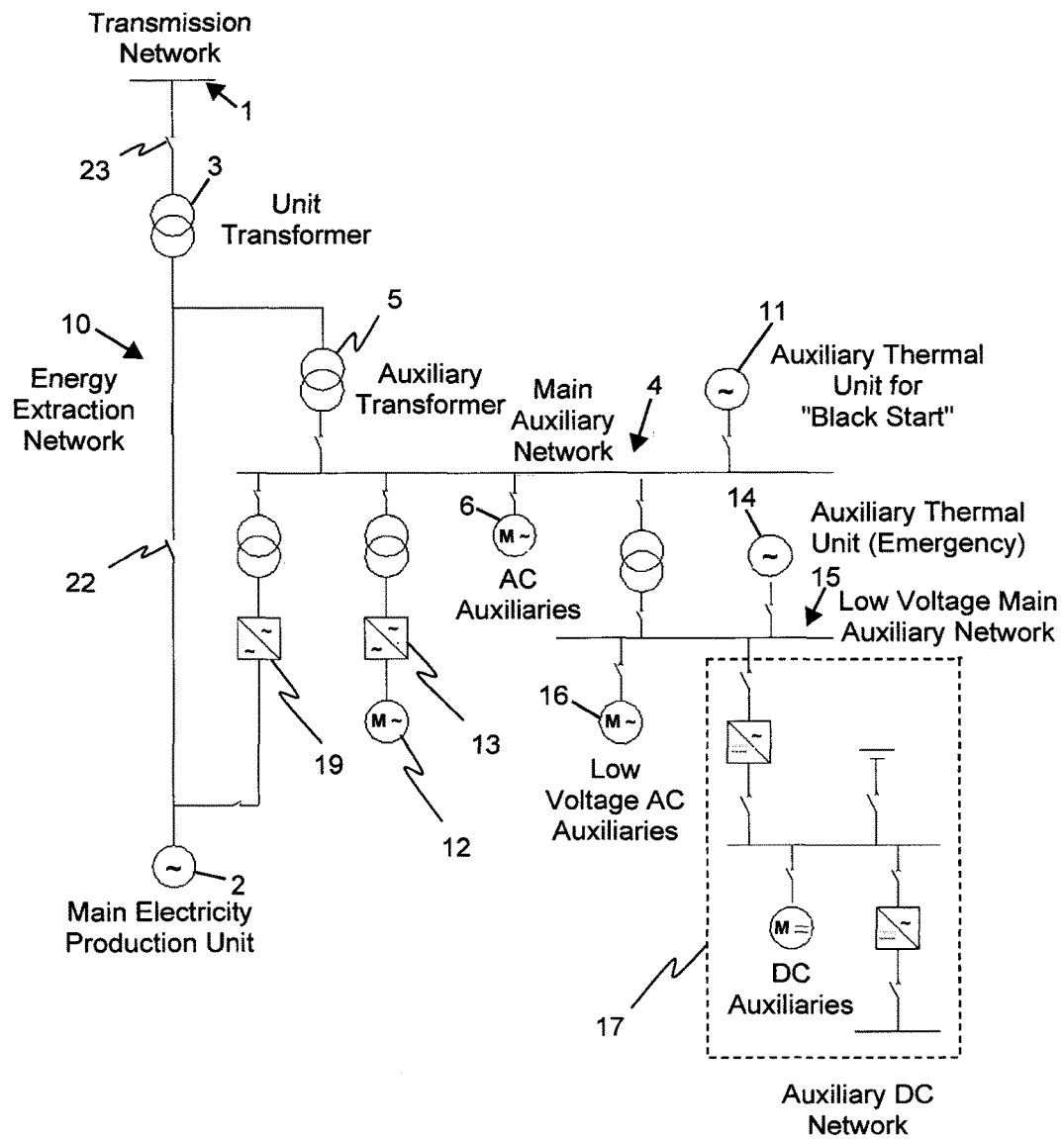
FIG. 1, a block diagram presenting the structure of an auxiliary network of a power plant according to the prior art with direct current auxiliary emergency equipment, as well as the principle of connection of the continuous and alternate power supply sources with the various equipment of the power plant.

Thus, in case of loss of supply of the main auxiliary network, the control system of the storage system may control, through appropriate interfaces with the control system of the network, the supply of the critical auxiliaries of the power plant from the energy storage elements. Thus, this characteristic of the system allows drastically simplifying the architecture of the auxiliary electricity distribution of the power plant by removing the direct current emergency auxiliary network 17 (shown in FIG. 1), as it ensures the same functions.

Thus the secondary unit 7 may, for example, be dimensioned to be able to instantly deliver to the electricity transportation network 1 electric power at least equal to the additional power which must be provided by the steam turbine of the main unit 2 in case of primary response request. Such that, the inertia of the steam turbine is compensated by the response speed of the secondary unit 7 and the main unit 2 can thus permanently operate at higher power.

It must be noted that the primary response corresponds to the fraction of rated power of the main unit 2 that must be capable of delivery to the network in a very short time. There is no required technique common to all the networks as each network operator is free to define its own requirements, by way of example, we can consider a power to the order of 2.5% of the rated power of the unit to deliver in time to the order of 30 seconds.

Furthermore, insofar as the considered power plant is fitted with an auxiliary thermal power generator 11 ensuring a "black-start" function, the secondary unit 7 may be dimensioned to be able to deliver, in addition to the time based profile of power required to ensure the supply of critical auxiliaries, a power at least equivalent to that of the auxiliary thermal unit 11.

Thus, such dimensioning allows advantageously using this thermal unit to provide network services, as for example the primary response. In fact, it is possible, through the control system of the storage system, to rapidly control the discharge of the storage elements in order to rapidly provide on the auxiliary network of the power plant a power equivalent to that of the black-start unit 11, and to control its starting so that it is substituted for the storage system once its startup sequence is complete.

Such principle may also be implemented to carry out network services through the emergency thermal power generator 14, and/or to ensure uninterrupted power supply to the charges fed by this emergency unit in case of break down of the supply of the main auxiliary network.

The modular structure of the secondary energy supply unit, associated with the use of reversible conversion means 82 from direct current to alternate current, configurable through control means provided to the system according to the embodiments of the disclosure, advantageously allows simplifying the composition and organization of attached means that an electricity production power plant may require under different circumstances. This also allows having a reconfigurable architecture that allows using the secondary unit 7 of the system according to the embodiments of the disclosure, to execute various tasks ordinarily carried out by other annex equipment which, by this fact, may be removed, or contribute to the execution of these same tasks in association with the other available annex means.

Thus, the annex electric energy production system according to the embodiments of the disclosure may be implemented to provide some network services when the power plant is shutdown. In fact, the main diagram described in FIG. 2 shows that it is possible to connect the system to the electricity transmission network 1, through the unit transformer 3 and the auxiliary transformer 5, such that it delivers to the network electric energy stored in the batteries 81 of the cells 8 constituting the secondary unit 7. As required, the control system of this system may be directly interfaced with the control system of the main unit 2 in order to control the command and protection devices such as the unit circuit breaker 22 or line circuit breaker 23.

Thus also, the annex electric energy production system according to the embodiments of the disclosure may be set up in a way as to be capable of supplying the power draw required during startup of the auxiliary motors 12, such that the emergency thermal unit 14 (diesel unit) is dimensioned only according to the permanent powers of the auxiliary motors.

Furthermore, the annex electric energy production system according to the embodiments of the disclosure may be set up in a manner as to deliver an alternating current at variable frequency allowing restarting the auxiliary motors 12 gradually, at variable frequency, in order to reduce the current draw during startup on dead bus, i.e. when there is no longer any voltage present on the alternate main auxiliary network 4, 15.

This functionality may be simply carried out through interface signals between the control system of the system and the control system of the main auxiliary network, or as required by adding a dedicated auxiliary panel to this restart function of the auxiliaries on the dead bus.

Figure 3:
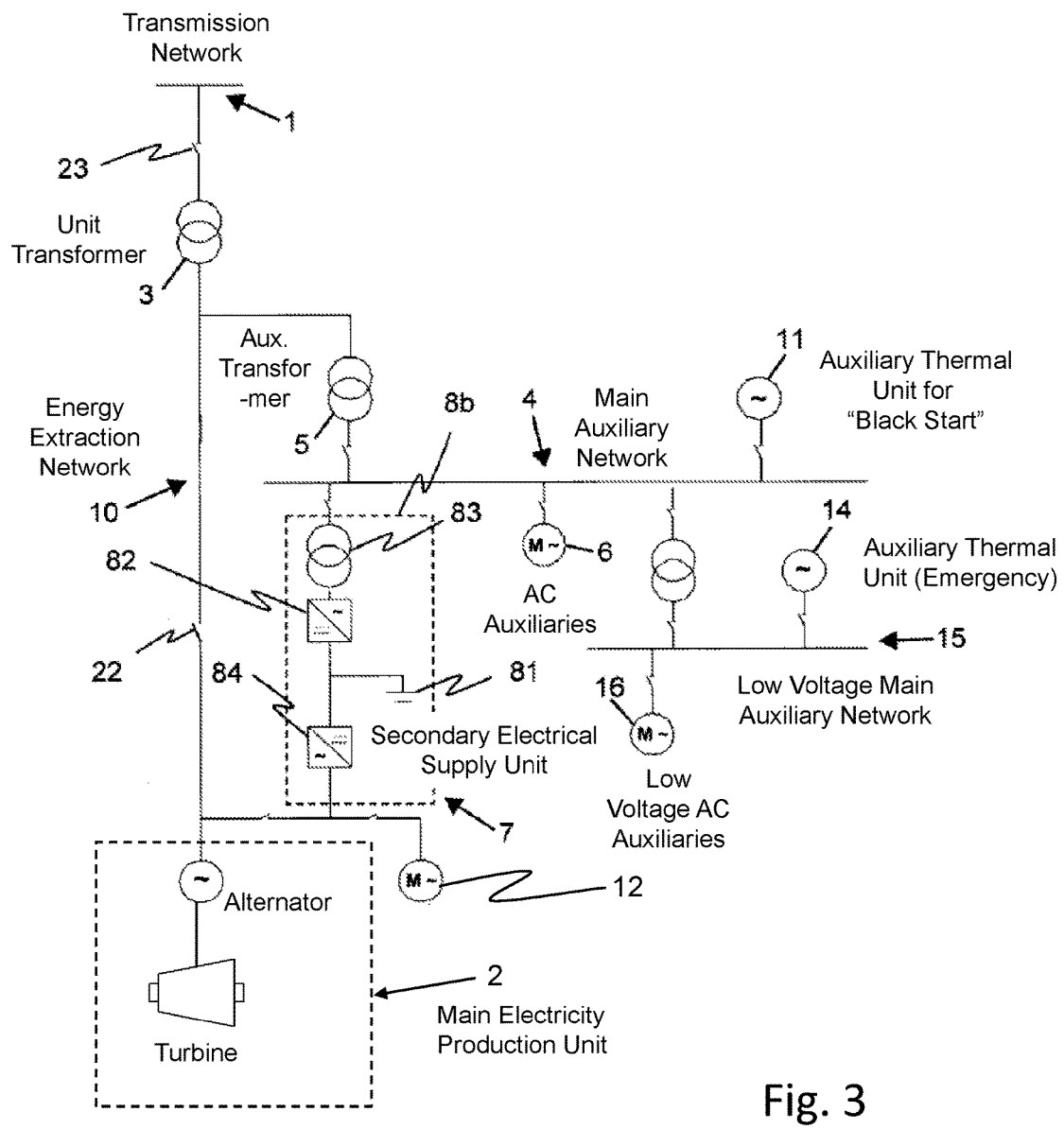
FIG. 3, a block diagram presenting the system according to another embodiment of the disclosure in an execution and interconnection variant allowing ensuring additional functionalities.

FIG. 3 presents through a diagram the principle of implementation of a variant of the system according to embodiments of the disclosure within the electricity distribution network of an electricity production power plant.

This execution variant is differentiated from that of FIG. 2 in that the secondary unit 7 of the electric energy supply bears one or more elementary units 8b each one comprising one or more reversible converters 84 of direct current electric energy to alternating current electric energy (AC-DC conversion and DC-AC conversion).

The second converter 84 is connected to the electric energy storage means 81 on the one hand and to the generator of the main unit 2 and/or to an auxiliary motor 12' on the other hand.

As in the previous embodiment, the secondary unit 7 of the system according to the invention may be connected, according to its power, either directly to a secondary branch of the unit transformer 3, or to a secondary branch of the auxiliary transformer 4, i.e. again to the unit transformer 3.

Also, as in the previous embodiment, the secondary energy supply unit 7 is dimensioned to carry out the required network services and to substitute the direct current emergency network by carrying out the corresponding function.

In the embodiment of FIG. 3, the annex electric energy production system according to the embodiments of the disclosure, may furthermore advantageously be implemented to carry out the functions normally carried out by the auxiliary equipment normally present in a power plant and to totally or partially substitute for this equipment. For this, the power equipment constituting the system (transformer 83, converters 82 and 84 and storage means 81) must be dimensioned in a manner such that they can provide at least power corresponding to the required network service and the new function for the required period, and must be configurable through command means that particularly control the mode of operation of the static power converters 82 and 84.

As in the previous embodiment, the control system of this energy production system may be interfaced as per requirement with the control system of the transmission network 1, the control system of the main unit 2 and control system of the auxiliary distribution network 4, 15 in order to control the operation of the different control bodies (circuit breakers, etc.) and to ensure the functions requested of the secondary unit 7.

Thus, for example, the system according to the embodiments of the disclosure may be implemented by using the static power converters 82 and 84 which are included in each cell 8 of the secondary unit 7, to ensure the static starting of the shaft line when the power plant is shutdown and that it is not used for any other function.

The static starting of the shaft line is usually carried out through a static frequency converter used to feed the generator in motor mode in order to engage the shaft line of the gas turbine in rotation in its start phase.

To execute this startup through the system according to the embodiments of the disclosure, the converter 82 is controlled as a rectifier (i.e. voltage source) in order to create, from the voltage present on the auxiliary network of the power plant 4, a DC voltage on the continuous bus inside the secondary unit 7. Thus, the converter 84 is controlled as an inverter such that it converts the DC voltage provided by the converter 82 into variable frequency AC voltage.

Thus, this configuration of the system according to the embodiments of the disclosure allows drastically simplifying the architecture of the accessories of the power plant by removing the static power conversion system 19 (see FIG. 1) normally dedicated to the starting of the shaft line.

Also, the annex electric energy production system according to the embodiments of the disclosure may advantageously be implemented, in a manner as to ensure the function of turning of the shaft line. For this, the converter 84 is controlled as inverter in a manner as to provide the power required for rotation at very low speed of the shaft line, when the power plant is shutdown.

Thus, this configuration of the system according to the embodiments of the disclosure allows assuming the function of turning while supplying the turning motor with the energy available on the auxiliary network and/or the energy stored in the storage means of the system, thus allowing advantageously simplifying the architecture of the auxiliaries of the power plant.

Also, in this same embodiment, the annex electric energy production system according to the embodiments of the disclosure may also be advantageously set up, in a manner as to provide all or part of the power required for the starting of the shaft line through electrochemical generators 81. For this the electric energy stored in the DC voltage generators (i.e. the batteries) 81 is converted into alternating current by the converters 82 and 84 and transferred to the generator in motor mode in order to cause the rotation of the shaft line of the gas turbine.

This system configuration according to the embodiments of the disclosure allows advantageously simplifying the architecture of the auxiliaries of the power plant by allowing removing the auxiliary thermal unit 11 required for starting the power plant in dead bus mode (i.e. when the power plant must restart without supply from the distribution network), or at least reducing the power of this unit and thus its cost by providing a part of the power required through storage elements 81.

Also, the annex electric energy system according to the invention may be advantageously set up, such that the static power converter 84 (insofar as it is not used as described above during the start phase of the power plant), can be used to supply a variable frequency auxiliary motor.

Thus, this system configuration allows advantageously simplifying the architecture of the accessories of the power plant by removing a static frequency converter dedicated to the supply of one or more variable speed auxiliary motors 12, as for example a boiler feed pump motor in a combined cycle power plant.

Furthermore, the annex electric energy production system according to the embodiments of the disclosure may also be advantageously set up, in order to allow providing temporary power required for feeding the static converter 84 through electrochemical generators 81.

Thus, this system configuration according to the embodiments of the disclosure allows ensuring continuous supply (such as voltage dip) of the motor driven through the converter 84, even when the main auxiliary network of the power plant is disturbed.

Furthermore also, the system according to the embodiments of the disclosure may also be advantageously set up, such that it allows drawing electric energy from the generator in order to charge the storage means 81 and/or to refeed the main auxiliary network 4 of the power plant through the converters 82 and 84 of this system in case of break down of the supply of the main auxiliary network 4.

For this, the converter must be controlled as rectifier 84 (i.e. as voltage source) in order to create and regulate, from the AC voltage generated by the generator, a DC voltage on the continuous bus inside the secondary unit 7 of the storage system. The converter 82 is controlled as inverter such that it converts the DC voltage provided by the converter 84 into variable frequency AC voltage.

This system configuration according to the embodiments of the disclosure allows drastically simplifying the architecture of the auxiliaries of the power plant by removing the emergency auxiliary thermal unit 14, or increasing the reliability of supply of the main auxiliary network of the power plant through this additional voltage source. In fact, in case of incidents on the electric energy transmission network 1, the power plant is capable of isolating itself from the network through line circuit breaker 23, and ensuring the supply of its auxiliaries by maintaining the main unit 2 in operation.

Furthermore, in this same embodiment, the annex electric energy production system according to the embodiments of the disclosure may be advantageously set up, such that it allows drawing the electric energy from the generator of the main unit 2, in order to refeed the main auxiliary network 4 of the power plant through converters 82 and 84 of this system in case of break down of the energy storage elements 81.

Thus, this system configuration according to the embodiments of the disclosure allows increasing the reliability of the secondary power unit 7 in case of break down of the energy storage elements 81, the power required to ensure feeding of the main auxiliary network 4 being in this case provided by the generator.

Furthermore, finally, in this same embodiment, the annex electric energy production system, according to the embodiments of the disclosure may be advantageously dimensioned and designed, such that it allows feeding the excitation system of the generator of the main unit 2 through an additional DC/AC converter connected in parallel to the converter 84.

Thus, this system configuration, according to the embodiments of the disclosure allows feeding the stator as well as the rotor of the generator such that it is possible to start the shaft line through the single system for production, with the energy available in the storage elements 81 and/or on the main auxiliary network 4.

Furthermore, it is to be noted that the setting up of the system according to the embodiments of the disclosure advantageously allows ensuring the critical auxiliary operation operating on direct current that it may be necessary to conserve, particularly in the event where the system, according to the embodiments of the disclosure is set up according to an operation for resetting to the order of the existing power plant. This direct current equipment, according to its quantity, may be directly connected through its control/protection equipment to the secondary unit 7 of the system at the outlet of the energy storage elements 81, or at the outlet of the secondary unit 7 through an additional AC-DC converter.

What is claimed is:

1. An annex electric energy supply system for an electrical power plant coupled to an electricity transmission network, the electrical power plant including a main electric energy production unit that includes at least one turbine connected to a generator, said annex electric energy supply system comprising:
   an energy extraction network coupled to the transmission network, said energy extraction network configured to receive AC current from the main electric energy production unit;
   a main auxiliary AC power bus network coupled to said energy extraction network, said main auxiliary AC power bus network operable to power auxiliary equipment required for operation of the electrical power plant; and a secondary electric energy supply unit comprising at least one continuously operable electric energy restitution and storage unit, said at least one electric energy restitution and storage unit comprising at least one electric energy storage element coupled to a first means for reversible conversion from direct current to alternating current, said first means for reversible conversion controllable to selectively (i) charge said at least one storage element from electric energy delivered by said main auxiliary AC power bus network, and (ii) discharge electric energy stored in said at least one storage element to said main auxiliary AC power bus network, wherein said secondary electric energy supply unit is configured to at least one of:

provide to the electricity transmission network, at least via said main auxiliary AC power bus network, a first profile of electric power at least sufficient to provide services requested by the electricity transmission network; and provide to said main auxiliary AC power bus network a second profile of power required to operate the auxiliary equipment of the power plant in case of inoperability of a normal AC power supply source of said main auxiliary AC power bus network.

2. The system according to claim 1, wherein said secondary electric energy supply unit is further configured to provide to the electricity transmission network the first profile of electric power sufficient to compensate for an inertia of the at least one turbine.

3. The system according to claim 1, wherein said secondary electric energy supply unit is connected to one of the electricity transmission network, said energy extraction network, and said main auxiliary AC power bus network.

4. The system according to claim 1, wherein said at least one electric energy restitution and storage unit comprises a plurality of electric energy restitution and storage units configured to operate simultaneously to produce at least one of the first profile of electric power and the second profile of electric power.

5. The system according to claim 1, wherein the electrical power plant further includes an auxiliary thermal power generator, said secondary electric energy supply unit is further configured to deliver a power at least equivalent to a power of the auxiliary thermal power generator.

6. The system according to claim 1, wherein the electrical power plant further includes a second auxiliary thermal power generator, and said secondary electric energy supply unit is further configured to deliver a power at least equivalent to a power of the second auxiliary thermal power generator.

7. The system according to claim 1, wherein the electrical power plant further includes an auxiliary thermal power generator and a second auxiliary thermal power generator, and said secondary electric energy supply unit is further configured to deliver a power at least equivalent to a sum of a power of the auxiliary thermal power generator and the second auxiliary thermal power generator.

8. The system according to claim 1, wherein said secondary electric energy supply unit is further configured to provide sufficient power to start the generator of the main electric energy production unit.

9. The system according to claim 1, wherein the electrical power plant further includes an auxiliary thermal power generator coupled to said main auxiliary AC power bus network, and wherein said secondary electric energy supply unit is further configured to provide sufficient power in combination with a power provided by the auxiliary thermal power generator to start the generator of the main electric energy production unit.

10. The system according to claim 1, wherein said at least one electric energy restitution and storage unit further comprises a second means for reversible conversion from direct current to alternating current, said second means for reversible conversion connected to said at least one electric energy storage element of said secondary electric energy supply unit and controllable to enable said secondary electric energy supply unit to selectively (i) supply electrical energy to the generator during a startup phase of the main electric energy production unit selectively from at least one of a voltage available on said main auxiliary AC power bus network and an energy available in said at least one electric energy storage element, and (ii) charge at least one of said at least one electric energy storage element and the power supply source of said main auxiliary AC power bus network by energy drawn through said second means for reversible conversion directly from terminals of the generator during operation of the generator.

11. The system according to claim 10, wherein said second means for reversible conversion are controllable to selectively provide a variable frequency supply voltage to motors of the auxiliary equipment configured to operate on variable frequency.

12. The system according to claim 10, wherein said at least one electric energy restitution and storage unit further comprises a DC/DC converter coupled in parallel to said second means for reversible conversion, said DC/DC converter configured to supply electrical power to a rotor of the generator of the main electric energy production unit.

13. The system according to claim 10, wherein said second means for reversible conversion comprise IGBT switches.

14. The system according to claim 10, further comprising command means configured to selectively operate said second means for reversible conversion as an AC-DC converter.

15. The system according to claim 10, further comprising command means configured to selectively operate said second means for reversible conversion as a DC-AC converter delivering an alternating current that is one of (i) a given fixed frequency, and (ii) a variable frequency.

16. The system according to claim 1, wherein said first means for reversible conversion comprise IGBT switches.

17. The system according to claim 1, further comprising command means configured to selectively operate said first means for reversible conversion as an AC-DC converter.

18. The system according to claim 10, further comprising command means configured to selectively operate each of said first means for reversible conversion and said second means for reversible conversion as a DC-AC converter delivering an alternating current that is one of (i) a given fixed frequency, and (ii) a variable frequency.

19. An electrical power plant coupled to an electricity transmission network, said electrical power plant comprising:

a main electric energy production unit comprising:
a generator;
at least one turbine connected to said generator; and
auxiliary equipment required for operation of said electrical power plant; and an annex electric energy supply system comprising:
an energy extraction network coupled to the transmission network, said energy extraction network configured to receive AC current from said main electric energy production unit;

a main auxiliary AC power bus network coupled to said energy extraction network, said main auxiliary AC power bus network operable to power said auxiliary equipment; and a secondary electric energy supply unit comprising at least one continuously operable electric energy restitution and storage unit, said at least one electric energy restitution and storage unit comprising at least one electric energy storage element coupled to a first means for reversible conversion from direct current to alternating current, said first means for reversible conversion controllable to selectively (i) charge said at least one storage element from electric energy delivered by said main auxiliary AC power bus network, and (ii) discharge electric energy stored in said at least one storage element to said main auxiliary AC power bus network, wherein said secondary electric energy supply unit is configured to at least one of:

provide to the electricity transmission network, at least via said main auxiliary AC power bus network, a first profile of electric power at least sufficient to provide services requested by the electricity transmission network while said main electric energy production unit is shutdown; and provide to said main auxiliary AC power bus network a second profile of power required to operate said auxiliary equipment in case of inoperability of a normal power supply source of said main auxiliary AC power bus network.

20. An electrical power plant coupled to an electricity transmission network, said electrical power plant comprising:

a main electric energy production unit comprising:
a generator;
at least one turbine connected to said generator; and
auxiliary equipment required for operation of said electrical power plant; and an annex electric energy supply system comprising:
an energy extraction network coupled to the transmission network, said energy extraction network configured to receive AC current from said main electric energy production unit;

a main auxiliary network coupled to said energy extraction network, said main auxiliary network operable to power said auxiliary equipment; and a secondary electric energy supply unit comprising at least one continuously operable electric energy restitution and storage unit, said at least one electric energy restitution and storage unit comprising at least one electric energy storage element coupled to a first means for reversible conversion from direct current to alternating current, said first means for reversible conversion controllable to selectively (i) charge said at least one storage element from electric energy delivered by said main auxiliary network, and (ii) discharge electric energy stored in said at least one storage element to said main network, wherein said secondary electric energy supply unit is configured to at least one of:

provide to the electricity transmission network a first profile of electric power at least sufficient to provide services requested by the electricity transmission network while said main electric energy production unit is shutdown; and provide to said main auxiliary network a second profile of power required to operate said auxiliary equipment in case of inoperability of a normal power supply source of said main auxiliary network, wherein said at least one electric energy restitution and storage unit further comprises a second means for reversible conversion from direct current to alternating current, said second means for reversible conversion connected to said at least one electric energy storage element and controllable to enable said secondary electric energy supply unit to selectively (i) supply electrical energy to said generator during a startup phase of said main electric energy production unit from at least one of a voltage available on said main auxiliary network and an energy available in said at least one electric energy storage element, and (ii) charge at least one of said at least one electric energy storage element and said normal power supply source of said main auxiliary network by energy drawn through said second means for reversible conversion directly from terminals of said generator during operation of said generator.

* * * * *